United States Patent
Kato et al.

(10) Patent No.: US 9,692,265 B2
(45) Date of Patent: Jun. 27, 2017

(54) VARIABLE MAGNETIC FLUX-TYPE ROTARY ELECTRIC MACHINE

(75) Inventors: Takashi Kato, Fujisawa (JP); Robert Lorenz, Madison, WI (US); Natee Limsuwan, Madison, WI (US)

(73) Assignees: Nissan Motor Co., Ltd., Yokohama (JP); Wisconsin Alumni Research Foundation, Madison, WI (US)

( * ) Notice: Subject to any disclaimer, the term of this patent is extended or adjusted under 35 U.S.C. 154(b) by 273 days.

(21) Appl. No.: 14/408,977

(22) PCT Filed: Jun. 26, 2012

(86) PCT No.: PCT/US2012/044262
§ 371 (c)(1),
(2), (4) Date: Dec. 18, 2014

(87) PCT Pub. No.: WO2014/003730
PCT Pub. Date: Jan. 3, 2014

(65) Prior Publication Data
US 2015/0340915 A1    Nov. 26, 2015

(51) Int. Cl.
*H02K 1/27* (2006.01)

(52) U.S. Cl.
CPC ........... *H02K 1/276* (2013.01); *H02K 1/2766* (2013.01); *H02K 1/2773* (2013.01)

(58) Field of Classification Search
CPC ..... H02K 1/276; H02K 1/2766; H02K 1/2773
USPC .................................................. 310/156.43
See application file for complete search history.

(56) References Cited

U.S. PATENT DOCUMENTS

| | | | | |
|---|---|---|---|---|
| 5,038,065 A * | 8/1991 | Matsubayashi | ........ | H02K 29/08 310/156.15 |
| 5,886,440 A * | 3/1999 | Hasebe | .................. | H02K 1/278 310/156.19 |
| 6,703,744 B2 * | 3/2004 | Yoshinaga | ............. | H02K 21/14 310/156.45 |
| 7,163,072 B2 * | 1/2007 | Yamaguchi | .............. | B60K 6/26 180/65.24 |
| 7,196,447 B2 * | 3/2007 | Tajima | .................. | B60L 15/025 310/156.53 |

(Continued)

FOREIGN PATENT DOCUMENTS

| EP | 0341630 A2 | 11/1989 |
|---|---|---|
| EP | 2463988 A2 | 6/2012 |

(Continued)

*Primary Examiner* — Alex W Mok
(74) *Attorney, Agent, or Firm* — Global IP Counselors, LLP

(57) ABSTRACT

A variable magnetic flux-type rotary electric machine includes a stator and a rotor. The stator includes a stator coil wound on teeth. The rotor defines an air gap between the rotor and the stator. The rotor has at least one permanent magnet arranged in the d-axis magnetic path. The stator and the rotor are arranged relative to the permanent magnet to set a characteristic of $d(Kt(I))/dI \geq 0$ in a range of at or below magnetic saturation of a core material of at least one of the stator and the rotor, where KT represents a torque constant, and I represents an applied current, and a function of KT with respect to I is represented by KT=Kt(I) for a torque Tr acting on the rotor that is represented by Tr=KT×I.

13 Claims, 7 Drawing Sheets

(56) References Cited

U.S. PATENT DOCUMENTS

| | | | |
|---|---|---|---|
| 7,301,310 B2 * | 11/2007 | Ganev | H02P 9/48 290/46 |
| 7,436,095 B2 * | 10/2008 | Aydin | H02K 1/2766 310/156.53 |
| 7,508,109 B2 * | 3/2009 | Yokota | H02K 15/03 310/216.048 |
| 2006/0028082 A1 | 2/2006 | Asagara et al. | |

FOREIGN PATENT DOCUMENTS

| | | |
|---|---|---|
| JP | H09-182331 A | 7/1997 |
| JP | 2001-157396 A | 6/2001 |
| JP | 2006-280195 A | 10/2006 |
| JP | 2007-116833 A | 5/2007 |
| JP | 2010-273416 A | 12/2010 |
| WO | 2012/004761 A2 | 1/2012 |

\* cited by examiner

VARIABLE MAGNETIC FLUX-TYPE ROTARY ELECTRIC MACHINE

CROSS-REFERENCE TO RELATED APPLICATIONS

This application is a U.S. National stage application of International Application No. PCT/JP2012/044262, filed Jun. 26, 2012, the contents of which is hereby incorporated herein by reference.

BACKGROUND

Field of the Invention

The present invention generally relates to a variable magnetic flux-type rotary electric machine.

Background Information

A rotary electric machine in which the armature magnetic flux linkage is varied has been disclosed in Japanese Laid-Open Patent Application No. 2006-280195 and the like (e.g., Japanese Laid-Open Patent No. 2006-280195). However, with the rotary electric machine disclosed in Japanese Laid-Open Patent Application No. 2006-280195, it has been necessary to control the magnetized state of the magnets. Control is thus difficult, and because magnets with small coercive field strengths have been used in order to control magnetic forces, it has been difficult to avoid demagnetization due to armature counteraction, resulting in restrictions on design and uses. In addition, there have been problems with high energy loss due to the flow of magnetization/demagnetization current.

SUMMARY

One object presented in this disclosure is to resolve these types of problems by providing a variable magnetic flux-type rotary electric machine that increases loss during low load, inhibits loss during high-speed rotation, and inhibits ohmic loss.

In view of the above, a variable magnetic flux-type rotary electric machine is proposed that basically comprises an annular stator and a rotor. The annular stator includes a stator coil wound on a plurality of teeth. The rotor has a circular shape that is concentric with the stator and defines an air gap between the rotor and the stator. The rotor has at least one permanent magnet arranged in the d-axis magnetic path. The stator and the rotor are arranged relative to the permanent magnet to set an operating characteristic of $d(Kt(I))/dI \geq 0$ in a range of at or below magnetic saturation of a core material of at least one of the stator and the rotor, where KT represents a torque constant, and I represents an applied current, and a function of the torque constant KT with respect to the applied current I is represented by $KT=Kt(I)$ for a given torque Tr acting on the rotor that is represented by $Tr = KT \times I$.

With the rotary electric machine of the present disclosure, loss during low load, loss during high-speed rotation, and ohmic loss can be inhibited by forming magnetic flux bypass paths that can inhibit the amount of magnetic flux leakage due to the stator armature action between adjacent magnetic poles. In addition, generation of maximum torque during high load can be achieved by inhibiting magnetic flux leakage due to the armature action. As a result, consumption of electricity during travel mode can be greatly improved by using the rotary electric machine of the present disclosure as an electric motor in electric vehicles.

Moreover, the rotary electric machine of the present disclosure has a configuration whereby the pathway for the magnetic flux of the magnet inside the rotor is inhibited by armature current without changing the magnetization condition of the permanent magnet. Inhibition is thus comparatively easy, and there is no associated energy loss, because magnetization/demagnetization is not carried out.

BRIEF DESCRIPTION OF THE DRAWINGS

Referring now to the attached drawings which form a part of this original disclosure.

DETAILED DESCRIPTION OF EMBODIMENTS

Selected embodiments of a variable magnetic flux-type rotary electric machine will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
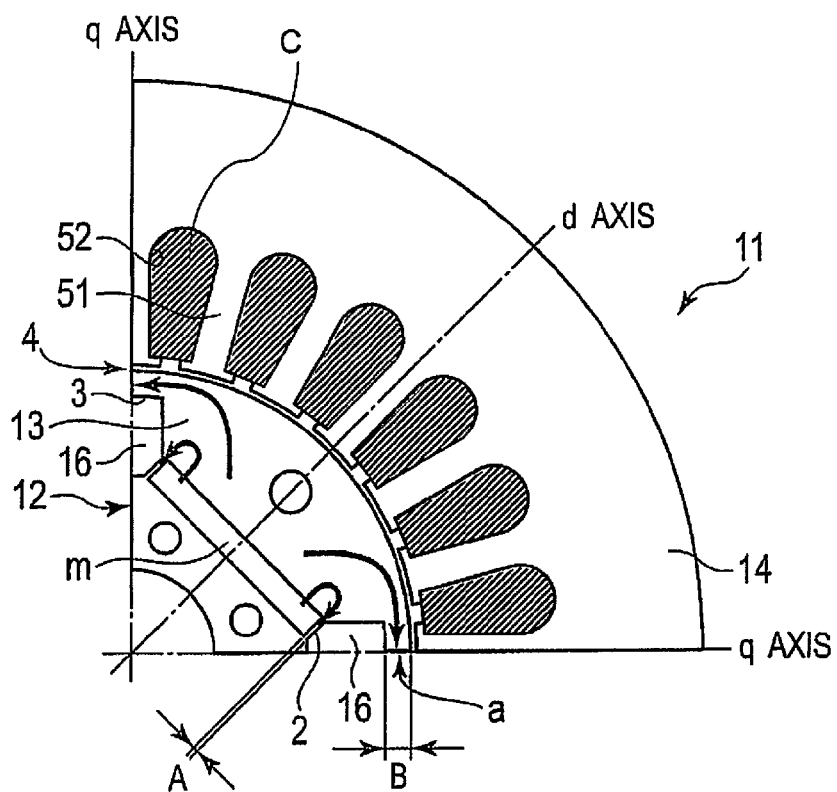
FIG. 1 is a diagram showing the configuration of a rotary electric machine pertaining to a first embodiment.

FIG. 1 is a diagram showing the configuration of a rotary electric machine pertaining to a first embodiment. A portion that constitutes one-fourth of the entire configuration is shown. Each other one-fourth of the remaining three-fourth of the entire configuration of the rotary electric machine repeats the illustrated one-quarter in a continuous repeating manner. As shown in FIG. 1, this rotary electric machine has a stator 11 that is formed in the shape of a ring, and a rotor 12 that is formed in the shape of a circle that is concentric with the stator 11 to form an electric motor or generator.

The stator 11 has a stator core 14 and a plurality of (e.g., 24) teeth 51 that protrude inwards from the stator core 14. The spaces between adjacent teeth 51 are regarded as slots 52. A stator coil C is wound on the teeth 51. The stator core 14 is formed, for example, from laminated iron sheets.

The rotor 12 has a rotor core 13, where the rotor core 13 is formed in the shape of a cylinder having a laminated iron sheet structure produced by the lamination of iron sheets that are formed from a metal having high magnetic permeability. In addition, on the circumferential edge part of the stator core 13, opposite the stator 11, four permanent magnets m (specifically, a quadrupole structure) are provided in the circumferential direction at equivalent spacing with respect to each other, with the polarity of adjacent permanent magnets being opposite. In FIG. 1, one-quarter of the entire rotary electric machine is shown, and thus only one permanent magnet m is shown.

Gaps are provided in opposing portions of the rotor core 13, and the permanent magnets m are rigidly fixed to the rotor core 13 by fitting the permanent magnets m into these gaps. In addition, the radial direction of the rotor 12 is the magnetization direction of the permanent magnets m. In this embodiment, the geometrical center of each of the permanent magnets m is taken as the d-axis, and the q-axis is defined as being at an electrical angle of 90° from the d-axis (in this embodiment, there are four poles, and so this position is 45° in terms of the mechanical angle).

The outer circumference of the rotor 12 has the shape of a circular arc, and electrical gap parts 16 are formed between adjacent magnetic poles. By forming these gap parts 16, two magnetic flux by-pass paths 3 are formed for each of the permanent magnets m in the continuous portion between adjacent magnetic poles on the outer circumferential part of the rotor core 13. Specifically, the magnetic flux bypass paths 3 are provided near the air gap 4 that serves as a gap portion between the stator 11 and the rotor 12. In addition, narrow magnetic paths 2 having widths A are produced between the permanent magnets m and the gap part 16. The widths A of the magnetic paths 2 are set so as to be smaller than widths B of the magnetic flux bypass paths 3. Specifically, the stator 11 and the rotor 12 are arranged relative to the permanent magnets m such that a relationship of A<B is set.

Because the relationship A<B set, the magnetic flux emanating from the permanent magnets m meet lower magnetic resistance when leaking towards the opposite pole side of the adjacent permanent magnets via the magnetic flux bypass path 3 than when leaking towards the opposite pole side of the permanent magnets m via the magnetic path 2. The magnetic flux passing through the magnetic paths 2 is the leak magnetic flux from the surface of the permanent magnet m to the back surface of the permanent magnet m, and the leak magnetic flux amount is nearly independent of armature current, thus constituting a simple magnetic flux loss, without merit. On the other hand, the magnetic flux passing through the magnetic flux bypass paths 3 can be inhibited by the armature current, and efficiency can thus be improved by appropriate inhibition in accordance with the machine operating point.

In addition, the magnetic resistance in the d-axis is set so as to be smaller than the magnetic resistance in the q-axis. In other words, salient pole characteristics are produced in which the inductance $L_d$ in the direction of the d-axis and the inductance $L_q$ in the direction of the q-axis are related by $L_d > L_q$.

In addition, for the permanent magnets m, the relationship between thickness and coercive field strength is determined by the stator specifications (characteristics) and the power source capacity, and permanent magnets are used for the permanent magnets m that can be magnetized and demagnetized by reversed electric fields.

Figure 2:
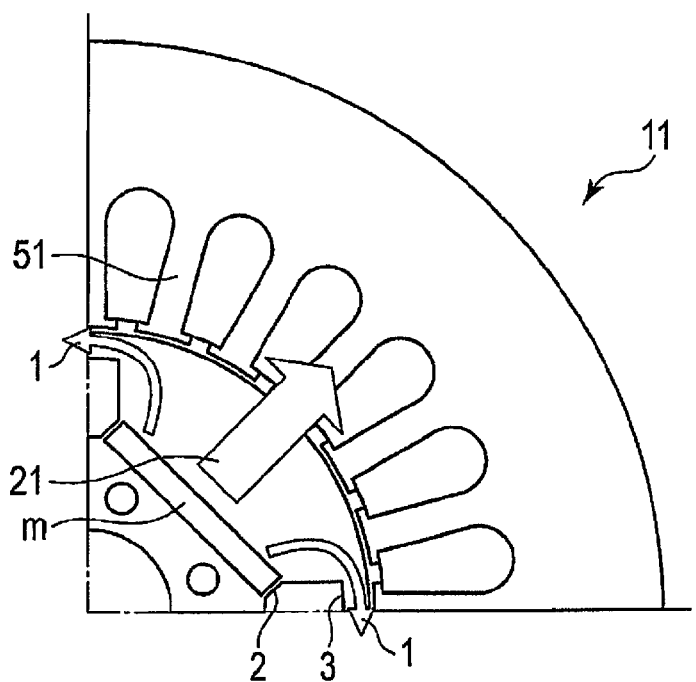
FIG. 2 is a diagram showing the magnetic flux flow of the rotary electric machine pertaining to an embodiment in a no-load state.

The operation of the rotary electric machine pertaining to the first embodiment is described below. FIG. 2 is an explanatory diagram showing the magnetic flux distribution when current is not supplied to the stator coil that is wound on the teeth 51 of the stator 11. As shown in FIG. 2, when current is not being supplied, one part of the magnetic flux 21 emanating from the permanent magnet m flows towards the stator 11, producing linkage with the stator coil. In addition, the other part of the magnetic flux 1 that has emanated from the permanent magnet m leaks towards the adjacent magnetic poles through the magnetic flux bypass paths 3 on both sides.

For this reason, it is easy to inhibit the amount of magnetic flux that leaks through the magnetic flux bypass paths 3. The desired torque thus can be easily generated by suppressing the amount of magnetic flux that produces linkage with the stator coil when the rotary electric machine is operating at low load.

Figure 3:
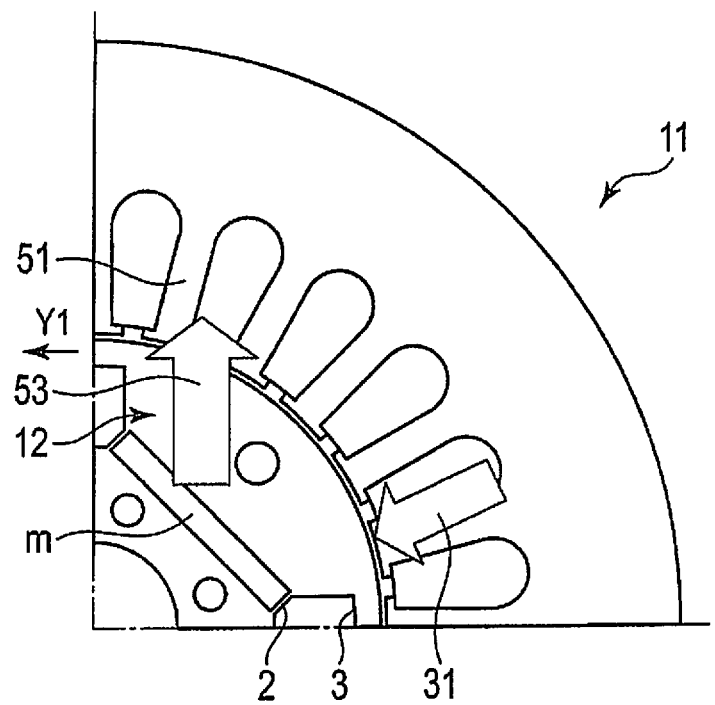
FIG. 3 is a diagram showing the magnetic flux flow when q-axis current is supplied to the stator coil of the rotary electric machine pertaining to an embodiment.

FIG. 3 is an explanatory diagram that shows the magnetic flux distribution when current is supplied to the stator coil. When the rotor 12 is rotating in the direction of the arrow Y1, the magnetic flux 53 that emanates from the permanent magnet m faces in the direction of rotation. In addition, it is understood that leakage of magnetic flux from the permanent magnet m to the magnetic flux bypass paths 3 is suppressed by the armature counteraction 31. Specifically, with the rotary electric machine of this embodiment, the magnetic flux bypass paths 3 (magnetic flux leak path) are provided so that magnetic flux leaks between adjacent magnetic poles during no load or low load. In addition, the magnetic flux bypass paths 3 (magnetic flux leak path) are disposed in positions whereby the leak magnetic flux flowing to the magnetic flux bypass paths 3 can be inhibited by armature action in accordance with armature current (with the machine being a function of current).

In this manner, with the rotary electric machine according to the first embodiment, the magnetic flux bypass paths 3 are provided to serve as pathways when magnetic flux emanating from the permanent magnet m leaks towards the adjacent permanent magnet. In addition, a magnetic flux inflow and outflow part (a portion indicated by symbol "a" in FIG. 1) of each of the magnetic flux bypass paths 3 are provided near the air gap 4. Consequently, magnetic flux flowing through the magnetic flux bypass paths 3 is readily inhibited by suppressing electric current flowing to the stator coil.

In addition, by increasing the leak magnetic flux when the rotor 12 rotates in a no-load condition or low-load condition, the magnetic flux involved in linkage with the stator 11 can be decreased, and loss can be decreased. Moreover, when rotating under high-load conditions, leak magnetic flux can be inhibited by inhibiting electric current flowing to the stator coil, and the magnetic flux is involved in linkage with the stator 11 can be increased, thereby providing high torque. As a result, mode travel electricity consumption can be greatly improved when the rotary electric machine of this embodiment is used in an electric vehicle.

In addition, by providing the magnetic flux bypass paths 3 near the air gap 4, the magnetic flux inflow and outflow parts are disposed in the vicinity of the air gap 4 without complicating the rotor structure, thereby making it easy to inhibit the amount of magnetic flux flowing through the magnetic flux bypass paths 3.

In addition, the width A of the magnetic path 2 and the width B of the magnetic flux bypass path 3 are provided with the relationship B>A, and, of the magnetic flux that emanates from the permanent magnet m, most of the leak magnetic flux is magnetic flux that passes through the magnetic flux bypass paths 3, allowing the amount of magnetic flux to be easily inhibited. In addition, inhibition can be improved even more if a configuration is used in which the relationship is B>2A.

Figure 13:
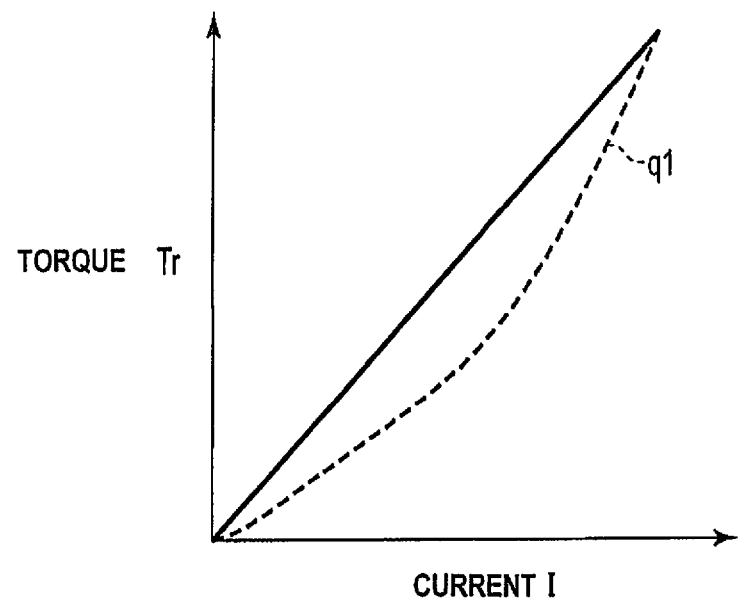
FIG. 13 is a characteristic diagram showing the relationship between torque and current flow to the stator coil in an embodiment.

With the rotary electric machine of this embodiment, when little current I is supplied to the stator coil, as during no load or low load, leak magnetic flux is generated that flows through the magnetic flux bypass path 3, thereby decreasing the back electromotive force that is induced in the stator coil by the magnetic flux of the permanent magnet m, which causes a resultant decrease in torque Tr that is produced in the rotor 12. In addition, when the current I that flows to the stator coil is increased in order to run the rotary electric machine at high speed, the leak magnetic flux decreases, and the amount of magnet magnetic flux that is involved in linkage with the armature increases, hereby allowing the torque Tr to be increased. Specifically, concerning the torque Tr and the current I with the rotary electric machine of this embodiment, the rate of change of the torque Tr increases along with an increase in the current I, as indicated by the symbol q1 in FIG. 13.

In other words, when the torque Tr is expressed in terms of the torque constant KT and the current I as Tr=KT×I, the torque constant KT is related to the current I by the function KT=Kt(I), and an operating characteristic having a relationship $d(Kt(I))/dI \geq 0$ is set at or below magnetic field saturation of the core material.

Consequently, the degree of linkage between the magnet magnetic flux and the stator coil increases when current is applied, and the torque constant increases. For this reason, in low-torque ranges, the degree of linkage between the magnet magnetic flux and the stator coil is decreased, loss is decreased, and the induced voltage is also decreased, which increases the variable speed range. In addition, the magnetic field circuit is symmetrical with respect to the center of the magnetic pole, and roughly similar characteristics are obtained regardless of the direction of rotation of the rotor 12.

Figure 14:
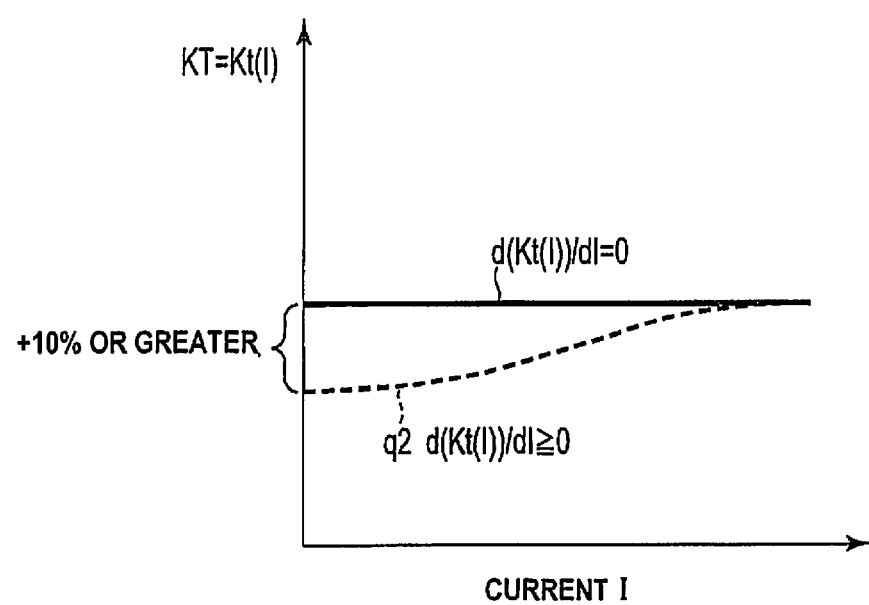
FIG. 14 is a characteristic diagram showing the relationship between torque constant and current flow to the stator coil in an embodiment.

In addition, with the above relationship $d(Kt(I))/dI \geq 0$ as pertains to the magnetic flux distribution of the magnet, the leak amount of magnetic flux of the magnet to the opposite pole during no load decreases when current is applied, and the maximum torque constant KT_max is set at 10% or greater than the minimum torque constant KT_min. Specifically, as indicated by curve q2 in FIG. 14, the torque constant KT is set at minimum value KT_min under no load when there is no current I that conducts to the stator coil and the torque constant KT is set at maximum value KT_max when the current I is large. The maximum torque constant KT_max is set to at least 10% greater than the minimum torque constant KT_min.

By setting the parameters in this manner, the magnet magnetic flux can be inhibited by normal current inhibition, without using a special inhibition method or additional structures. Consequently, performance can be improved without an increase in cost. Moreover, the level of weak magnetic field inhibition during high-speed rotation can be decreased, and a low-cost magnet having low coercive field strength can be used. Alternatively, the size of the magnets can be decreased.

In addition, in the first embodiment, the motor has salient pole characteristics in which the relationship between the inductance Ld in the d-axis direction and the inductance Lq in the q-axis direction is Ld>Lq, and thus positive reluctance torque can be obtained when positive d-axis current is applied to the stator coil, which allows the maximum torque to be increased.

In addition, for the permanent magnet m, a magnet is used that can be magnetized/demagnetized by the counter magnetic field that can be generated by the stator specifications and the power source capacity, and thus the characteristics of motors that utilize the rotary electric machine can be changed.

Figure 4:
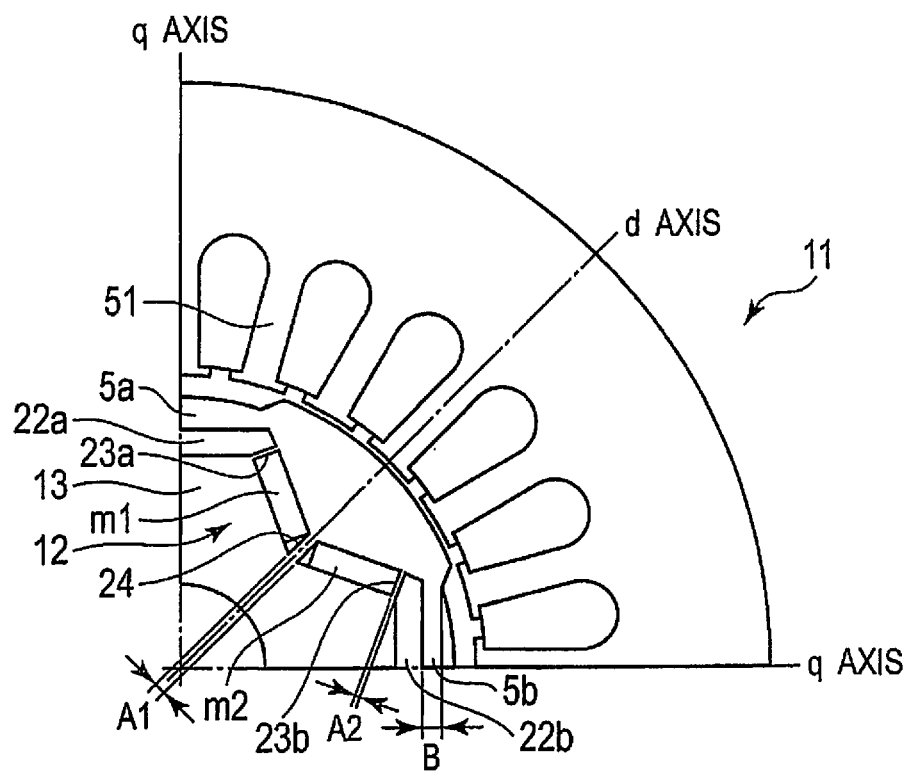
FIG. 4 is a diagram showing the configuration of a rotary electric machine pertaining to a first modification example of the first embodiment.

Next, a modification example of the rotary electric machine presented in the first embodiment will be described with reference to FIGS. 4 to 8. FIG. 4 is a diagram showing a first modification example. With the rotor 12, two permanent magnets m1 and m2 are inclined with respect to the circumferential direction and are provided symmetrically with respect to the d-axis. In addition, as shown in FIG. 4, magnetic field impeding parts 22a and 22b are formed to the side of the permanent magnet m1 and the permanent magnet m2. Magnetic flux flowing between the rotor core 13 and the magnetic flux bypass paths 5a and 5b is thus shielded by the magnetic field impeding parts 22a and 22b. In addition, by forming the magnetic field impeding parts 22a and 22b, the magnetic path 23a provided on the side part of the permanent magnet m1 and the magnetic path 23b provided on the side part of the permanent magnet m2 each have narrow widths (widths A2). A magnetic path 24 is thus formed between the two permanent magnets m1 and m2, and this magnetic path 24 also has a small width (width A1). In addition, the widths A1 and A2 of the magnetic path 24 and the magnetic paths 23a and 23b are set to be smaller than the width B of the magnetic flux bypass path 3.

Consequently, in the first modification example having this configuration, similar effects as with the first embodiment described above can be achieved.

Figure 5:
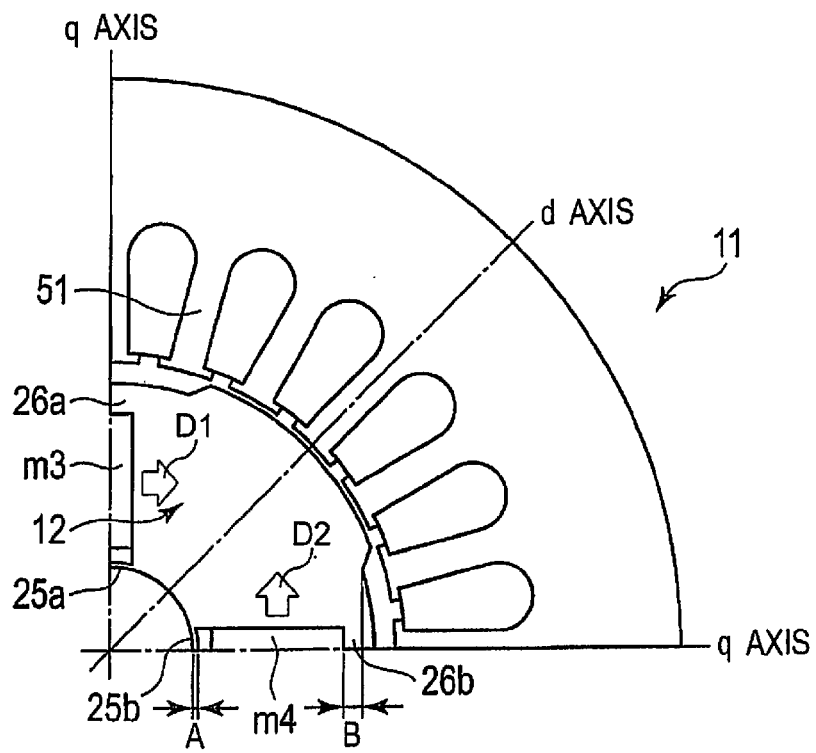
FIG. 5 is a diagram showing the configuration of a rotary electric machine pertaining to a second modification example of the first embodiment.

FIG. 5 is a diagram showing a second modification example. As shown in FIG. 5, in the second modification example, two permanent magnets m3 and m4 are provided in one magnetic pole of the rotor 12. The respective permanent magnets m3 and m4 are disposed so that their lengthwise directions coincide with the q-axes that constitute the center axes between the magnetic poles (axes that are inclined at 45° relative to the d-axis). In addition, the respective permanent magnets m3, m4 are magnetized in directions that are at right angles with respect to the radial direction as shown by arrows D1 and D2.

Magnetic flux bypass paths 26a and 26b are formed in the rotor 12 which is the end part of the outer circumferential side of the permanent magnets m1 and m2, and narrow-width magnetic paths 25a and 25b are formed via gap parts in the rotor 12 that serves as the end part of the inner circumferential side. The widths A of the magnetic paths 25a and 25b shown in FIG. 5 are set so as to be smaller than the widths B of the magnetic flux bypass paths 26a and 26b.

Consequently, similar effects as with the first embodiment described above can be achieved in the second modification example having this configuration.

Figure 6:
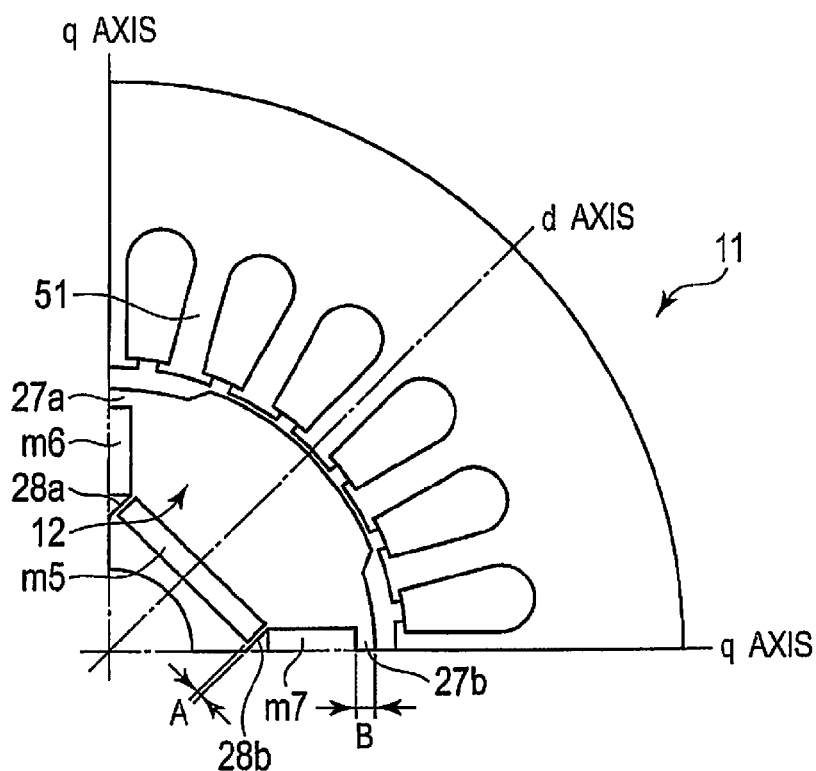
FIG. 6 is a diagram showing the configuration of a rotary electric machine pertaining to a third modification example of the first embodiment.

FIG. 6 is a diagram showing a third modification example. As shown in FIG. 6, in the third modification example, three permanent magnets m5, m6 and m7 are provided inside a single magnetic pole of the rotor 12. Of magnets, permanent magnet m5 is disposed so that the lengthwise direction thereof runs along the circumferential direction of the rotor 12, and the center thereof roughly coincides with the d-axis. In addition, the permanent magnet m5 is magnetized in the radial direction of the rotor 12. The permanent magnets m6 and m7 are disposed so that the lengthwise directions thereof coincide with the q-axes that serve as center axes between magnetic poles. In addition, the permanent magnets m6 and m7 are magnetized in a direction that is perpendicular with respect to the radial direction.

Magnetic flux bypass paths 27a and 27b are provided at the end parts on the outer circumferential sides of the permanent magnets m6 and m7, and narrow-width magnetic paths 28a and 28b are provided at both ends of the permanent magnet m5. The width A of the magnetic paths 28a and 28b is set so as to be smaller than the width B of the magnetic flux bypass paths 27a and 27b.

Consequently, similar effects as with the first embodiment described above can be achieved in the third modification example having this configuration.

Figure 7:
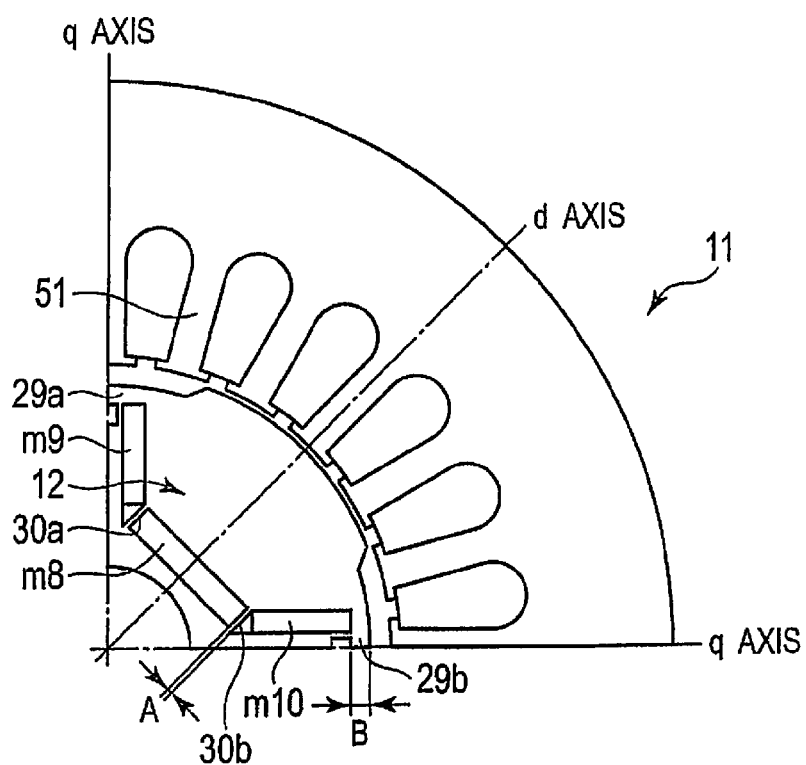
FIG. 7 is a diagram showing the configuration of a rotary electric machine pertaining to a fourth modification example of the first embodiment.

FIG. 7 is a graph showing a fourth modification example. As shown in FIG. 7, in the fourth modification example, three permanent magnets m8, m9 and m10 are provided in a single magnetic pole of the rotor 12. Of the magnets, the permanent magnet m8 is disposed so that the longitudinal direction runs in the circumferential direction of the rotor 12, and the center thereof roughly coincides with the d-axis. In addition, the permanent magnet m8 is magnetized in the radial direction of the rotor 12. The permanent magnets m9 and m10 are disposed at positions whereby they are slightly inwards from the q-axes, and the permanent magnets m9 and m10 are magnetized in a direction that is perpendicular with respect to the radial direction of the rotor 12.

Magnetic flux bypass paths 29a and 29b are provided at the end parts of the outer circumferential sides of the permanent magnets m9 and m10, and narrow-width magnetic paths 30a and 30b are provided at both ends of the permanent magnet m8. The widths A of the magnetic paths 30a and 30b are set so as to be smaller than the widths B of the magnetic flux bypath paths 29a and 29b.

Consequently, similar effects as with the first embodiment can be attained in the fourth modification example having this configuration.

Figure 8:
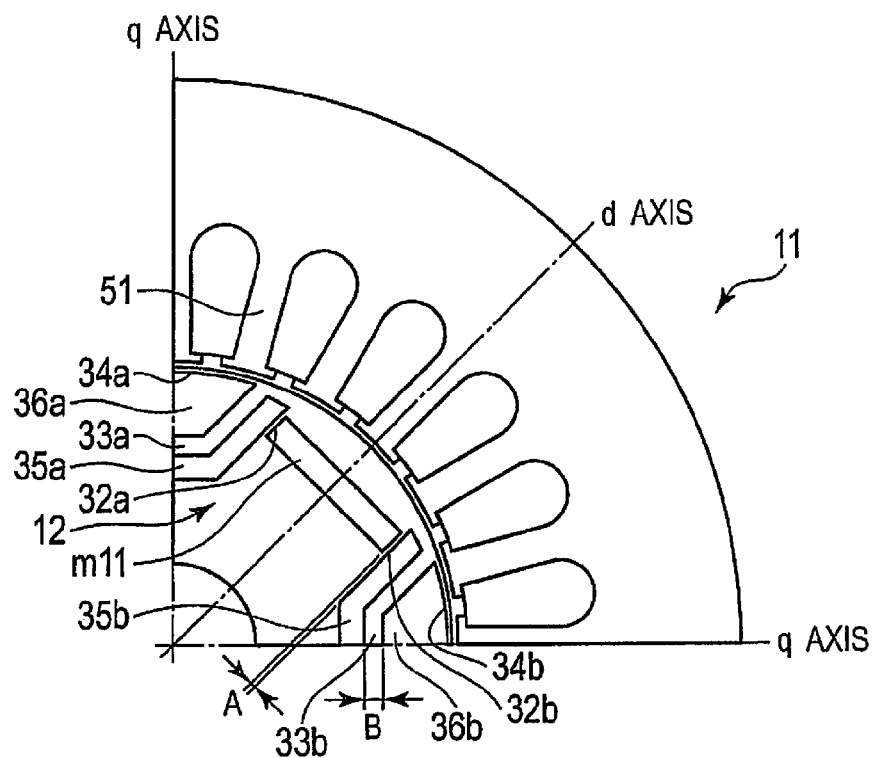
FIG. 8 is a diagram showing the configuration of a rotary electric machine pertaining to a fifth modification example.

FIG. 8 is a diagram showing a fifth modification example. As shown in FIG. 8, in the fifth modification example, a permanent magnet m11 is provided towards the outer circumferential side in one magnetic pole of the rotor 12. The permanent magnet m11 is magnetized in the radial direction of the rotor 12. In addition, magnetic field impeding parts 35a and 35b are provided on both ends of the permanent magnet m11, and magnetic field impeding parts 36a and 36b are provided to the outside thereof. In addition, magnetic paths 32a and 32b are produced between the permanent magnet m11 and the magnetic field impeding parts 35a and 35b, and magnetic flux bypass paths 33a and 33b are produced between the magnetic field impeding parts 35a and 35b to the inside and the magnetic field impeding parts 36a and 36b to the outside. In addition, the outer circumferential parts of the magnetic field impeding parts 36a and 36b to the outside produce magnetic paths 34a and 34b. In addition, the width A of the magnetic paths 32a, 32b is set so as to be smaller than the width B of the magnetic flux bypass paths 33a and 33b.

Consequently, similar effects as with the first embodiment can be achieved in the fifth modification example having this configuration.

Second Embodiment

Figure 9:
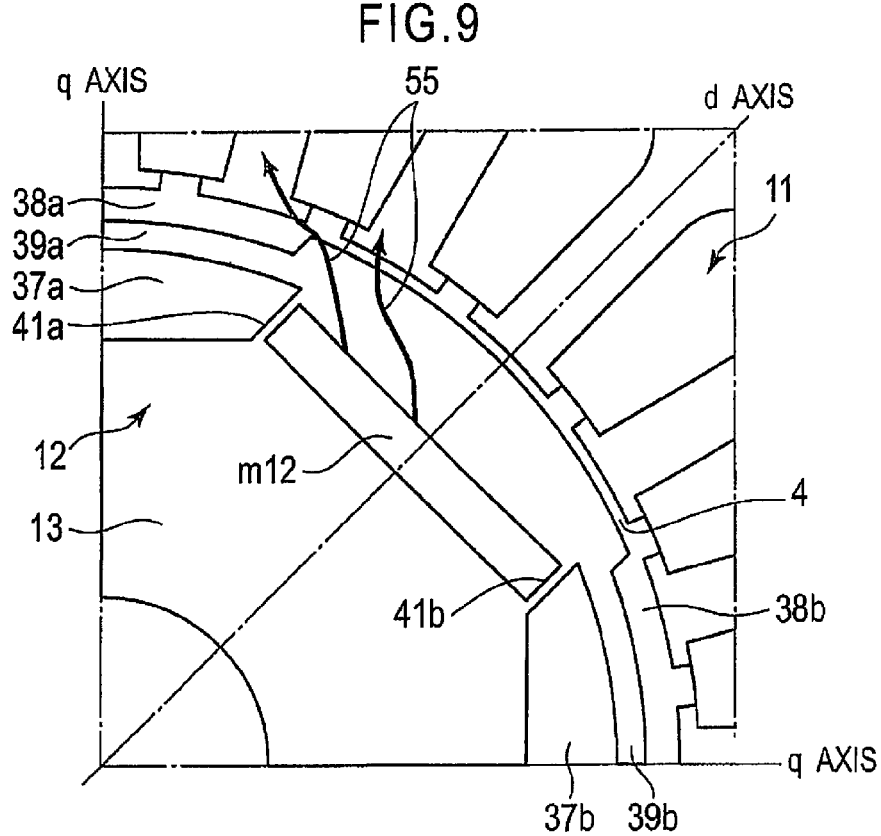
FIG. 9 is a diagram showing the configuration of a rotary electric machine pertaining to a second embodiment.

A second embodiment is described below. FIG. 9 is a diagram showing the configuration of the rotary electric machine of the second embodiment. In FIG. 9, only one-fourth of the entire rotary electric machine is shown. Each other one-fourth of the remaining three-fourth of the entire configuration of the rotary electric machine repeats the illustrated one-quarter in a continuous repeating manner. For the sake of simplicity, the same reference numbers of the first embodiment will be used to describe the second embodiment. As shown in FIG. 9, as with the first embodiment described above, the rotary electric machine of the second embodiment has the annular stator 11 and the rotor 12 concentrically arranged with the air gap 4 serving as a gap portion between the stator 11 and the rotor 12. The rotor 12 has a rotor core 13.

On the circumferential edge part of the stator core 13 opposite the stator 11, four permanent magnets m (specifically, a quadrupole structure) are provided along the circumferential direction at equivalent spacing with respect to each other, with the polarity of adjacent permanent magnets being opposite. In FIG. 9, one-quarter of the entire rotary electric machine is shown, and so only one the permanent magnet m12 is shown. In addition, in this embodiment, the permanent magnet m12 is provided towards the outer circumferential side of the rotor core 13.

Gaps are provided in opposing portions of the rotor core 13, and the permanent magnet m12 is rigidly fixed on the rotor core 13 by fitting into a gap. In addition, the center of the permanent magnet m12 coincides with the d-axis, and the radial direction of the rotor 12 is the magnetization direction.

In addition, magnetic field impeding parts 37a and 37b that shield the flow of magnetic flux are provided at the sides of the permanent magnet m12, and magnetic flux bypass paths 39a and 39b are formed at the outer circumferential sides of the magnetic field impeding parts 37a and 37b. In addition, magnetic field impeding parts 38a and 38b are produced on the outer circumferential sides of the magnetic flux bypass paths 39a and 39b. Specifically, the magnetic field impeding parts 38a and 38b are formed between the rotor 12 and the air gap 4, and thus the gaps between the magnetic flux bypass paths 39a and 39b and the stator 11 are large. In addition, narrow-width magnetic paths 41a and 41b are produced between the permanent magnet m12 and the magnetic field impeding parts 37a and 37b. The magnetic field impeding parts can be formed from materials having relative permeabilities of 1, such as resin or air.

With the rotary electric machine according to the second embodiment, the magnetic flux bypass paths 39a and 39b and the stator 11 are magnetically separated by providing the magnetic field impeding parts 38a and 38b. In addition, magnetic impeding parts 37a and 37b are provided to the inside of the magnetic flux bypass paths 39a and 39b, and magnetic separation thus is also provided with respect to the inside of the stator core 13 by providing the magnetic field impeding parts 37a and 37b.

Figure 10:
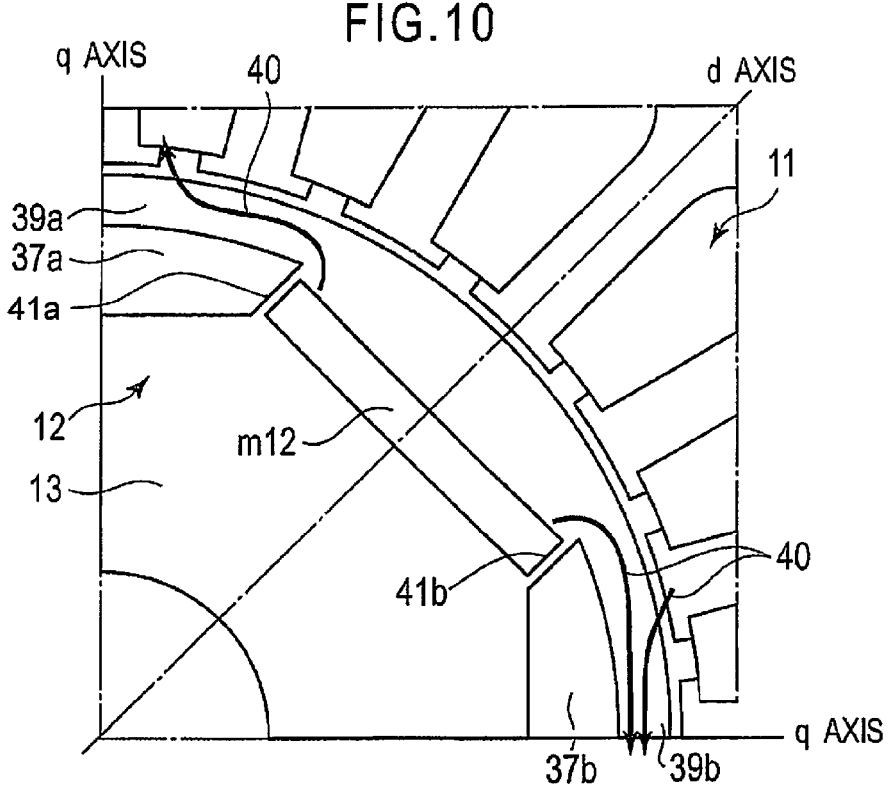
FIG. 10 is an explanatory diagram showing the flow of magnetic flux when a magnetic field impeding part is not provided in the rotary electric machine of the second embodiment.

FIG. 10 shows the flow of magnetic flux when the magnetic field impeding parts 38a and 38b shown in FIG. 9 are not provided between the stator 11 and the magnetic flux bypass paths 39a and 39b. During conduction, leak magnetic flux 40 is generated towards the stator 11 through the magnetic flux bypass paths 39a and 39b, which causes a decrease in torque due to a decrease in the magnet magnetic flux inhibition capacity. However, as shown in FIG. 9, by providing the magnetic impeding parts 38a and 38b, leak magnetic flux 40 shown in FIG. 10 can be inhibited, even though there is magnetic flux 55 that flows towards the stator 11, and the capacity for inhibiting magnetic flux can be increased.

In this manner, with the rotary electric machine of the second embodiment, the magnetic resistance between the rotor core 13 and the stator 11 can be increased by forming magnetic impeding parts 38a and 38b between the rotor core 13 and the stator 11, and leak magnetic flux 40 flowing from the rotor core 13 to the stator 11 can be inhibited. In addition, the magnetic field resistance from the magnetic flux bypass paths 39a and 39b to the stator 11 is increased, and it is possible to thereby inhibit loss in magnetic flux inhibition level and decrease in torque due to magnetic flux projection.

Third Embodiment

Figure 11:
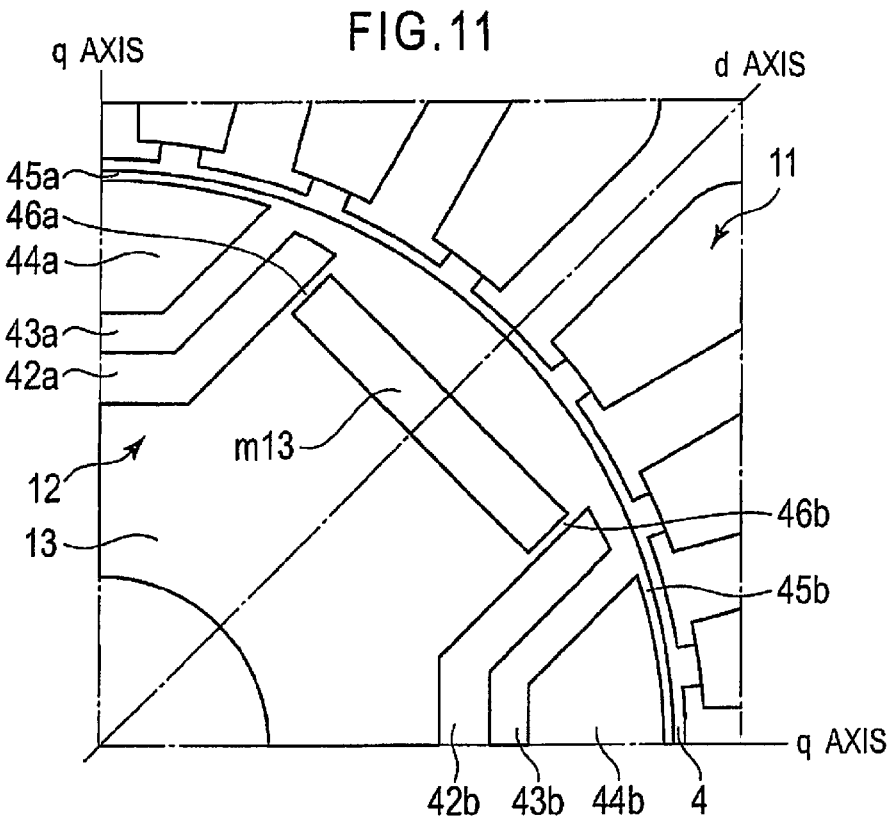
FIG. 11 is a diagram showing the configuration of a rotary electric machine pertaining to a third embodiment.

A third embodiment is described below. FIG. 11 is a diagram showing the configuration of the rotary electric machine according to a third embodiment. FIG. 11, as with the first and second embodiments, shows only one-fourth of the entire rotary electric machine. Each other one-fourth of the remaining three-fourth of the entire configuration of the rotary electric machine repeats the illustrated one-quarter in a continuous repeating manner. For the sake of simplicity, the same reference numbers of the first embodiment will be used to describe the third embodiment. As shown in FIG. 11, as with the first and second embodiments described above, the rotary electric machine of the second embodiment has the annular stator 11 and the rotor 12 concentrically arranged with the air gap 4 serving as a gap portion between the stator 11 and the rotor 12. The rotor 12 includes the rotor core 13.

On the circumferential edge part of the stator core 13 opposite the stator 11, four permanent magnets m (specifically, a quadrupole structure) are provided in the circumferential direction at equivalent spacing with respect to each other, with the polarity of adjacent permanent magnets being opposite. In FIG. 11, one-quarter of the entire rotary electric machine is shown, and so only one the permanent magnet m13 is shown.

Gaps are provided in opposing portions of the rotor core 13, and the permanent magnet m13 is rigidly fixed on the rotor core 13 by fitting into a gap. In addition, the center of the permanent magnet m13 coincides with the d-axis, and the radial direction of the rotor 12 is the magnetization direction.

In addition, magnetic field impeding parts 42a and 42b that shield the flow of magnetic flux are provided at the sides of the permanent magnet m13, magnetic flux bypass paths 43a and 43b are formed at the outer circumferential sides of the magnetic field impeding parts 42a and 42b, magnetic impeding parts 44a and 44b are provided on the outer circumferential sides of the magnetic flux bypass paths 43a and 43b, and narrow-width bridge-forming parts 45a and 45b are provided on the outer circumferential sides of the magnetic impeding parts 44a and 44b. Consequently, the air gap 4 is produced between the bridge-forming parts 45a and 45b and the stator 11.

In addition, narrow-width magnetic paths 46a and 46b are produced between the permanent magnet m13 and the magnetic impeding parts 42a and 42b, and the width of the magnetic paths 46a and 46b is roughly the same as the width of the bridge-forming parts 45a and 45b.

With the rotary electric machine according to the third embodiment, the magnetic flux bypass paths 43a and 43b and the stator 11 are magnetically separated by the magnetic impeding parts 44a and 44b. In addition, magnetic impeding parts 42a and 42b are provided on the inside of the magnetic flux bypass paths 43a and 43b, and the magnetic flux bypass paths 43a and 43b and the inside of the rotor core 13 are magnetically separated by the magnetic field impeding parts 42a and 42b. Consequently, it is possible to decrease the leak magnetic flux flowing from the rotor core 13 to the stator 11.

In addition, by providing narrow-width bridge-forming parts 45a and 45b, permeance pulsation can be decreased, and torque rippling can be reduced, thus contributing to an increase in torque.

Fourth Embodiment

Figure 12:
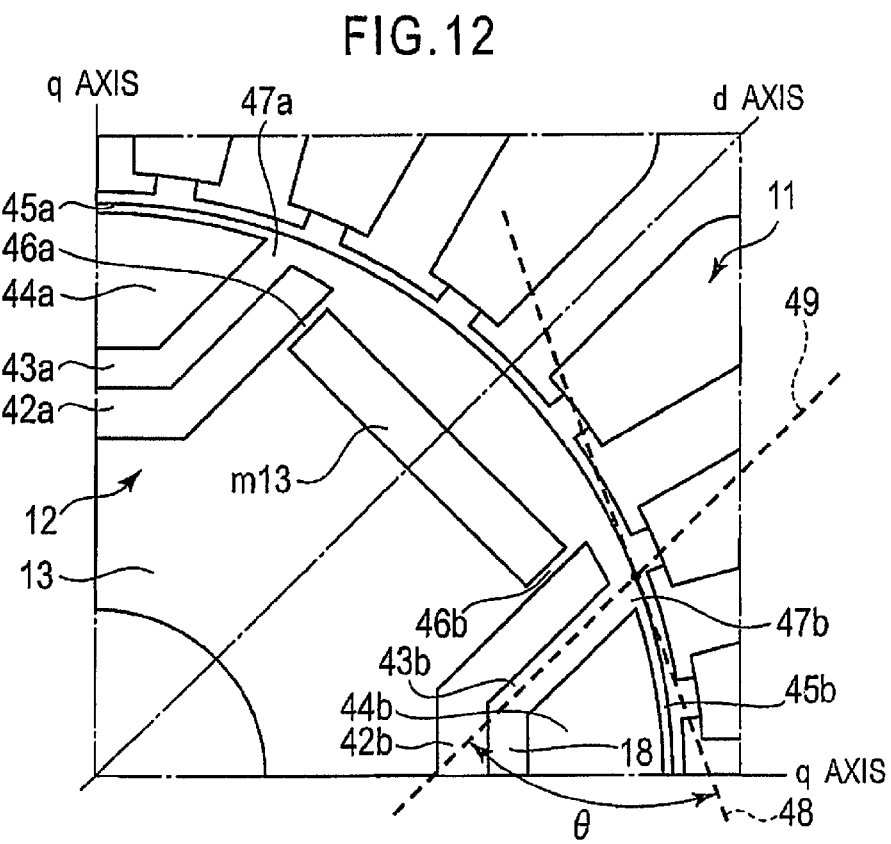
FIG. 12 is a diagram showing the configuration of a rotary electric machine pertaining to a fourth embodiment.

A fourth embodiment is described below. FIG. 12 is a diagram showing the configuration of the rotary electric machine according to a fourth embodiment. The rotary electric machine according to the fourth embodiment has roughly the same configuration as the rotary electric machine of the third embodiment described above. Consequently, the same parts have been assigned the same symbols, and descriptions of their configurations have been omitted.

With the rotary electric machine according to the fourth embodiment, as shown in FIG. 12, bridge-forming parts 45a and 45b are provided on the outer circumferential part of the rotor 12, and the bridge-forming parts 45a and 45b and the magnetic flux bypass paths 43a and 43b are connected by connector parts 47a and 47b. Magnetic field impeding parts 44a and 44b are produced between the bridge-forming parts 45a and 45b and the magnetic flux bypass paths 43a and 43b.

With the rotary electric machine of this embodiment, the connector parts 47a and 47b are provided near the air gap 4, and the angle θ formed between the tangent 48 of the rotor 12 at the connecting parts 47a and 47b and the magnetic flux vector direction 49 in the magnetic flux bypass paths 43a and 43b is set so as to be in the range of 45° to 90°.

By setting the angle in this manner, magnetic flux that flows into, or out from, the magnetic flux bypass paths 43a and 43b passes through the connector parts 47a and 47b at the distal ends of the magnetic flux bypass paths 43a and 43b, and thus inhibition of leak magnetic flux can be effectively achieved by the counter magnetic field of the stator 11. In addition, magnetic field inhibition from the magnetic flux bypass paths 43a and 43b to the stator 11 is increased, and it is possible to reduce the amount of magnetic flux inhibition or torque loss due to magnetic flux projection.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A variable magnetic flux-type rotary electric machine comprising:
    an annular stator including a stator coil wound on a plurality of teeth;
    a rotor having a circular shape that is concentric with the stator and defines an air gap between the rotor and the stator, and the rotor including at least one permanent magnet arranged in a d-axis magnetic path, a shape of a magnetic field circuit being roughly symmetrical with respect to a magnetic pole center;
    an electrical gap part formed adjacent and spaced from the at least one permanent magnet in the rotor;
    a magnetic path formed between the at least one permanent magnet and the electrical gap part;
    a magnetic flux bypass path formed between the electrical gap part and the air gap, a first width of the magnetic path being less than a second width of the magnetic flux bypass path;
    the stator and the rotor being arranged relative to the at least one permanent magnet to set an operating characteristic of $d(Kt(I))/dI \geq 0$ in a range of at or below magnetic saturation of a core material of at least one of the stator and the rotor, where KT represents a torque constant, and I represents an applied current, and a function of the torque constant KT with respect to the applied current I is represented by $KT=Kt(I)$ for a given torque Tr acting on the rotor that is represented by $Tr=KT \times I$.

2. The variable magnetic flux-type rotary electric machine according to claim 1, wherein
    a distribution of a magnetic flux emanating from the at least one permanent magnet has the characteristic $d(Kt(I))/dI \geq 0$ such that the stator and the rotor is arranged relative to the at least one permanent magnet to set a leak amount of magnetic flux of the at least one permanent magnet to an opposite pole in a no-load state that decreases with an application of current, and a maximum torque constant KT_max that is 10% or more greater than a minimum torque constant KT_min.

3. The variable magnetic flux-type rotary electric machine according to claim 2, wherein
    regarding a magnet magnetic flux characteristic of the magnetic field circuit, the stator and the rotor is arranged relative to the at least one permanent magnet to set a magnetic flux inflow and outflow part of the magnetic flux bypass path that serves as a route for leakage of magnetic flux to an adjacent permanent magnet pole is disposed near the air gap between the rotor and the stator such that a magnetic flux emanating from the at least one permanent magnet experiences a smaller magnetic field resistance against leakage towards an opposite pole of an adjacent permanent magnet that is adjacent to the at least one permanent magnet than a magnetic field resistance against leakage towards an opposite pole of the at least one permanent magnet.

4. The variable magnetic flux-type rotary electric machine according to claim 2, wherein
    a magnetic field impeding part is provided between the magnetic flux bypass path and the air gap to inhibit magnetic flux leakage from the magnetic flux bypass part to a stator core of the stator.

5. The variable magnetic flux-type rotary electric machine according to claim 2, wherein
    the rotor has salient pole characteristics in which a d-axis inductance Ld is larger than a q-axis inductance Lq.

6. The variable magnetic flux-type rotary electric machine according to claim 2, wherein
    the at least one permanent magnet has a relationship between a magnet thickness and a coercive field strength that is set in accordance with a characteristics of the stator and a power source capacity for driving the rotary electric machine to provide a magnetization/demagnetization capability in which the at least one permanent magnet is selectively magnetized and demagnetized by reversed electric fields during operation.

7. The variable magnetic flux-type rotary electric machine according to claim 1, wherein
    regarding a magnet magnetic flux characteristic of the magnetic field circuit, the stator and the rotor is arranged relative to the at least one permanent magnet to set a magnetic flux inflow and outflow part of the magnetic flux bypass path that serves as a route for leakage of magnetic flux to an adjacent permanent magnet pole is disposed near the air gap between the rotor and the stator such that a magnetic flux emanating from the at least one permanent magnet experiences a smaller magnetic field resistance against leakage towards an opposite pole of an adjacent permanent magnet that is adjacent to the at least one permanent magnet than a magnetic field resistance against leakage towards an opposite pole of the at least one permanent magnet.

8. The variable magnetic flux-type rotary electric machine according to claim 7, wherein
    the magnetic flux inflow and outflow part of the magnetic flux bypass path is disposed near the air gap, and the magnetic flux bypass path is arranged so that an angle formed between a direction of the magnetic flux vector in the air gap and a direction of a tangent at an intersection between an arc of an outer circumference of the rotor and the magnetic field vector is in a range of 45° to 90°.

9. The variable magnetic flux-type rotary electric machine according to claim 1, wherein
    a magnetic field impeding part is provided between the magnetic flux bypass path and the air gap to inhibit magnetic flux leakage from the magnetic flux bypass part to a stator core of the stator.

10. The variable magnetic flux-type rotary electric machine according to claim 9, wherein
    the rotor core has a bridge-forming part that is disposed between the magnetic impediment and the air gap.

11. The variable magnetic flux-type rotary electric machine according to claim 9, wherein
    the magnetic flux inflow and outflow part of the magnetic flux bypass path is disposed near the air gap, and the magnetic flux bypass path is arranged so that an angle formed between a direction of the magnetic flux vector in the air gap and a direction of a tangent at an intersection between an arc of an outer circumference of the rotor and the magnetic field vector is in a range of 45° to 90°.

12. The variable magnetic flux-type rotary electric machine according to claim 1, wherein
    the rotor has salient pole characteristics in which a d-axis inductance Ld is larger than a q-axis inductance Lq.

13. The variable magnetic flux-type rotary electric machine according to claim 1, wherein
    the at least one permanent magnet has a relationship between a magnet thickness and a coercive field strength that is set in accordance with a characteristics of the stator and a power source capacity for driving the rotary electric machine to provide a magnetization/demagnetization capability in which the at least one permanent magnet is selectively magnetized and demagnetized by reversed electric fields during operation.

* * * * *